Figure 5:
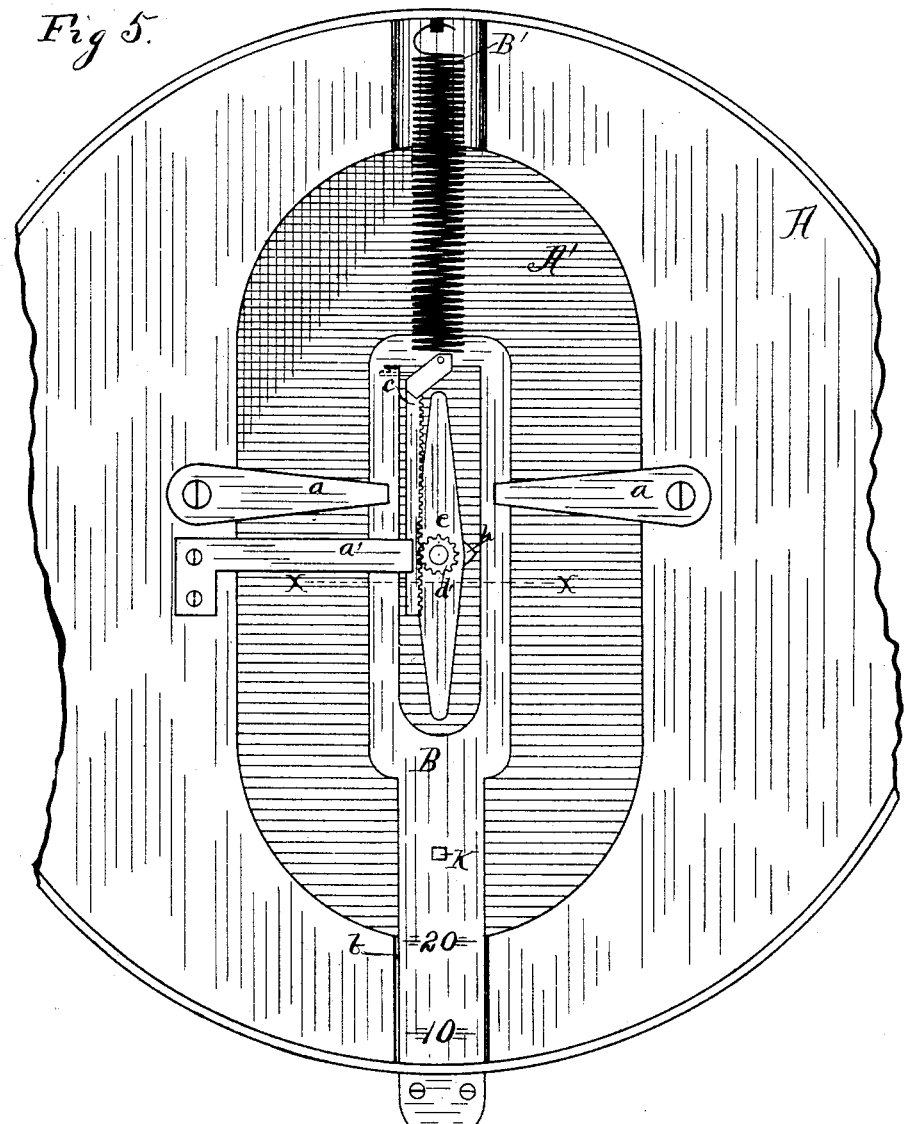

(No Model.)  3 Sheets—Sheet 1.
J. H. SWIHART.
COMPUTING SCALE.
No. 535,965. Patented Mar. 19, 1895.
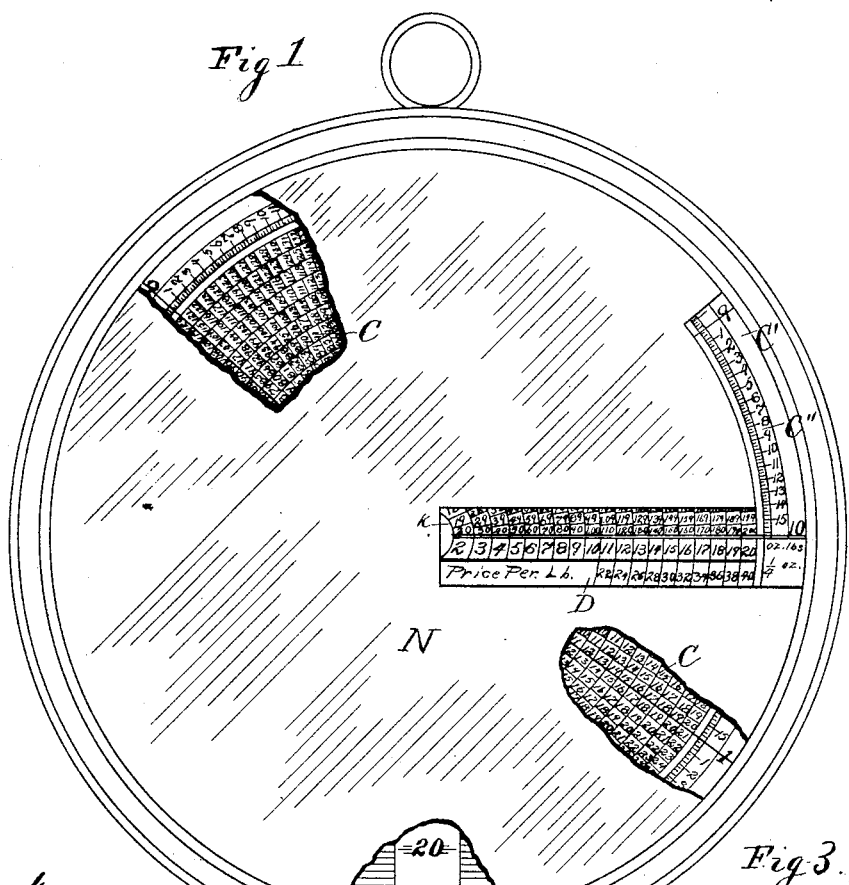
WITNESSES:
Lester L. Allen.
Charles A. Hoyt.
INVENTOR
John H. Swihart.
BY
R. J. McCarty.
ATTORNEY.

(No Model.) 3 Sheets—Sheet 2.

J. H. SWIHART.
COMPUTING SCALE.

No. 535,965. Patented Mar. 19, 1895.

WITNESSES:
Lester L. Allen.
Charles A. Hoyt.

INVENTOR
John H. Swihart.
BY
R. J. McCarty.
ATTORNEY.

(No Model.) 3 Sheets—Sheet 3.

J. H. SWIHART.
COMPUTING SCALE.

No. 535,965. Patented Mar. 19, 1895.

WITNESSES:
Lester L. Allen.
Charles A. Hoyt.

INVENTOR
John H. Swihart.
BY
R. J. McCarty.
ATTORNEY.

UNITED STATES PATENT OFFICE.

JOHN HENRY SWIHART, OF DAYTON, OHIO.

COMPUTING-SCALE.

SPECIFICATION forming part of Letters Patent No. 535,965, dated March 19, 1895.

Application filed June 4, 1894. Serial No. 513,487. (No model.)

*To all whom it may concern:*

Be it known that I, JOHN HENRY SWIHART, of Dayton, county of Montgomery, State of Ohio, have invented a new and useful Improvement in Computing-Scales; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain improvements in weighing scales, with a more specific reference to spring-balance scales of the computing type, or that class of scales that are provided with means for simultaneously indicating the value and weight of a given article or quantity of merchandise.

The object of the invention is to provide a spring-balance scale of the dial type, upon which the weight in units and fractional parts, of articles to be sold, and the money value of said unit or fractional parts, are arranged in a novel manner with a view to utilizing the entire space on the dial, which space, it is desirable, should be circumscribed or limited as much as possible.

A further and important object of my invention, is to provide improved mechanism, intervening between the computing dial, and the sliding bar from which the scale pan is suspended, through the agency of which said dial is not called upon to instantly respond to the undue momentum imparted to said sliding bar, due to the sudden placing of a load upon, or a sudden removal of a load from the scale pan, and to this extent said dial and adjunctive devices are protected from sudden vibrations that would tend to impair the efficiency of the scale; and further, the means provided for relieving the dial from these sudden vibrations or jerks due to the causes stated, will also perform the function of revolving said dial, independently of the momentum imparted by the sliding bar, to a proper position to indicate the weight and value of the article sold. To these ends I provide certain mechanism through the instrumentality of which the aforesaid independent movement may be imparted to the dial, and any lost motion between the sliding bar and the dial thereby avoided or compensated for.

With the above general statement of invention in mind, I will proceed to specify the various parts thereof, making a preliminary reference to the annexed drawings forming a supplement to the specification.

Figure 6:
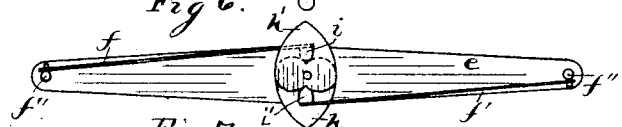
Figure 7:
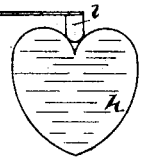
Figure 8:
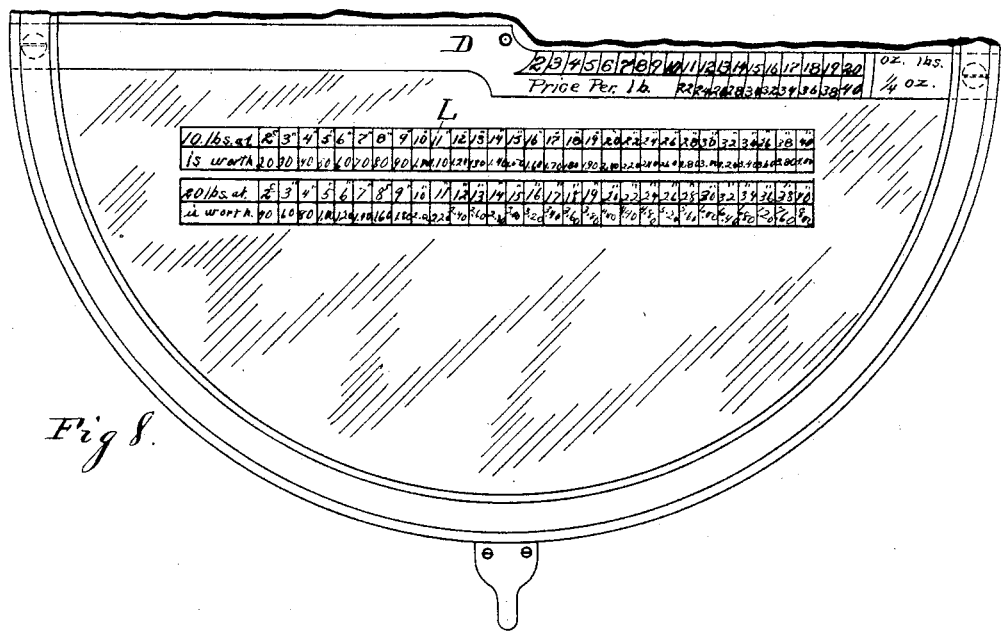
Figure 9:
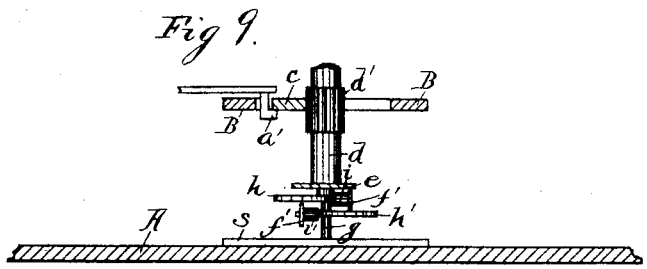

Figure 1, is a front elevation of a scale made in accordance with my invention. Portions of the concealing disk are broken away to reveal parts of the computing dial. Fig. 2 is an enlarged plan view of the heart-cams, and the spring-supporting bar; Fig. 3, a vertical elevation of the dial-actuating mechanism, removed from the main supporting plate; Fig. 4, a vertical section through the shaft and pinion sleeve; Fig. 5, an elevation of the main supporting plate, showing the inner face thereof, the sliding bar and dial-actuating mechanism; Fig. 6, an enlarged plan view of the heart-cams, springs and spring-supporting bar; Fig. 7, a detached, detail enlarged view of one of the heart-cams, showing the positions of the cam and pin when the dial is revolving with the pinion sleeve, or is at rest; Fig. 8, a front elevation of the scale, the upper portion broken away. The object of this view is to exhibit the supplemental table or scale by which the values of pounds in excess of ten pounds may be readily ascertained; ten pounds being the present limit of the dial. Fig. 9 is a section on the line $x$—$x$ Fig. 5.

In the detailed description to follow letters of similar import will be found on corresponding parts.

Referring to Fig. 5 on Sheet 2, A indicates a metallic supporting plate, concaved and circular in form and having an oblong recess A' in its vertical center to provide space for the location of the dial-actuating mechanism.

B designates the sliding bar vertically movable in guides (*a*)—(*a*) attached to plate A, and in slot (*b*) formed in said plate. The lower end of said bar is provided with an eye to which may be linked, a hook to support the scale pan, not shown in the drawings.

B' designates a spring attached to the plate A and to the sliding bar, against the tension of which the sliding bar is drawn when a load is placed on the scale pan. The sliding bar is provided with an opening in its upper portion to permit of the free movement of said bar, and the parts adjacent thereto.

(c) designates a rack bar pivoted at one end to the sliding bar; (d), a sleeve with a pinion (d') formed thereon that meshes with said rack bar, and (a') designates an angular stop bar attached to the plate A, which limits the movement of the rack bar from the pinion. To the inner end of the pinion sleeve (d) there is rigidly attached a bar (e).

(f) and (f') designate springs having their outer ends attached to lugs (f'') projecting from the ends of said bar. Upon the inner ends of these springs there are attached pins (i) and (i') having their outer ends rounded substantially as shown in Fig. 7.

From the foregoing description it will be noted the sleeve (d), pinion (d'), bar (e) and springs (f) and (f') are in rigid attachment, therefore, move together when operated.

(g) denotes a shaft providing a bearing for the pinion sleeve, and the portion inclosed by said sleeve is provided with a varying diameter as shown in Fig. 4, so that a small part only, of said shaft comes in frictional contact with the sleeve. Therefore, the least possible resistance is offered these parts.

(h) and (h') designate heart-cams having a rigid attachment with the shaft (g). The positions in which these cams are mounted are clearly shown in the various views, wherein it will be noted one is slightly above the other and both are adjacent to the spring-supporting bar (e). The pins (i) and (i') normally press against the peripheries of the cams under the tension of said springs.

(j) designates a plate rigidly attached to the outer end of the shaft (g), upon which the value and weight indicating dial C is mounted subject to revolution.

It will be noted from the foregoing, the shaft (g), heart-cams (h) and (h') and the dial C are in rigid attachment, therefore, are subject to a common movement independently of the pinion sleeve and the parts movable therewith. Bearings for the shaft (g) are provided, respectively, in the plate (s), see Fig. 9, attached to the supporting plate A, and transverse bar D. See Figs. 3 and 8. The bar D is screwed to the rim of the plate A, in front of the dial, and upon it, are indicated, numerals designating the prices per pound of the various articles.

Referring to Fig. 5, it will be seen that a load placed upon the scale pan will have the effect of moving the sliding bar B, carrying the rack bar therewith, which, meshing with the pinion, will rotate the latter. This draft on the sliding bar, when steady and free from jerks or sudden vibrations, will rotate in unison, the shaft and pinion sleeve with their respective attachments. This uniform movement is due to the tension of the springs (f) and (f') being greater than the combined weight of the shaft (g) and the parts attached thereto, to wit, the dial C and the heart-cams.

The pins (i); and (i') being normally in the notched or inwardly curved parts of said cams, the shaft is compelled to rotate with the pinion sleeve. Should a quick momentum, however, be imparted to the sliding bar, it will move the pinion sleeve and spring-supporting bar (e) alone, for an instant, thus withdrawing the pins from the notches in the cams, causing them as the bar (e) rotates, to move to a greater or less extent, on the inclined peripheries of said cams. As the momentum of the sliding bar recovers from the sudden impetus, or stops under the weight of the load, the pressure of the springs (f) and (f') will snap the cams to their normal position, shown in Fig. 6, and bring the dial in a position wherein the figures on said dial denoting the weight and value will be in alignment with those on the price per pound bar D. It will be observed, when the movable parts are under a gradual and systematic movement, the strain, and the friction due to the weight of all the parts, are confined to the pinion and rack, but at a time when these parts should be relieved of as much strain as possible, the weight of the dial is instantly taken off the pinion sleeve. The cams and springs acting somewhat on a plan analogous to that of a governor, regulate the movement of the dial with reference to the motion imparted to the pinion sleeve.

As illustrated in Fig. 1, the scale has a capacity for computing the money value of goods at from two to forty cents per pound up to ten pounds.

Referring to dial C, Fig. 1, upon which the computations are shown, the two circumferential columns C' and C'' bear numerals indicating pounds and ounces. Inclosed by these two columns are a series of concentric circles subdivided into uniform spaces, radiating from the inner circle (k). The graduated numbers in these radial spaces represent the value in money of the article weighed, and are brought in alignment with the numerals representing the price per pound on the bar D, by the load.

To illustrate the operation attention is called to Fig. 1, where it will be noted figure 10 in the unit column C' is on a horizontal plane with the upper edge of the bar D, upon which the prices per pound are indicated. To ascertain the value of ten pounds of any article selling at, say, twenty cents per pound, the figures on the dial immediately above "20" on the bar D, and in alignment therewith, will give the total value, to wit: two dollars.

In order to increase the capacity of the scale and adapt it to weigh and compute up to, say thirty pounds, I place on the sliding bar B, figures 10 and 20 denoting one and two revolutions of the dial; the lug K projecting from said bar and limiting the downward movement thereof denoting the third revolution of said dial and indicating that thirty pounds have been weighed, "20" appearing on the bar B and "10" on the dial. A supplemental price table or scale L is conveniently placed on the lower face of the scale, see Fig. 8, containing numerals indicating prices per pounds and values at ten and twenty pound quantities, the weights between ten and twenty pounds being indicated on the dial. When this supplemental scale is used the weight will be indicated on the sliding bar B; and assuming it to be "20" and the value per pound "20," (twenty multiplied by twenty equals four hundred,) this total will be found in the lower column in scale L directly below "20" in the adjacent column.

As shown in Fig. 1, I prefer to conceal the computing dial with a disk N having a suitable sight-opening through which the figures may be read, and over this disk a glass face or crystal may be placed to protect the mechanism from dust. Deeming the mechanism through which the dial is relieved of any abrupt movement or strain of the sliding bar, and by which said dial is compelled to respond to the movement of said bar thereby avoiding any lost motion, a very essential part of my invention, I do not desire to limit myself to the use of two cams, as a greater number of these devices may be used. I find in practice, however, that the number and arrangement of said cams herein shown and described, are preferable.

The mechanism for operating the dial may be equally effective for revolving a computing cylinder, by changing the location of the cams and springs. Therefore, I do not wish to restrict myself to its use in connection with a dial.

Having fully described my invention, I claim—

1. The combination of a spring-controlled sliding bar; a rack bar pivoted thereto; a pinion sleeve movable by said rack bar; a transverse bar fixed to said pinion sleeve; springs provided with pins, mounted on said bar; a shaft inclosed by said pinion sleeve; and cams rigidly mounted on said shaft, against which the pins on the springs normally rest, whereby means are provided for effecting independent movements of said pinion sleeve, and shaft.

2. The combination of a value and weight-indicating dial, a price per pound scale adjacent thereto, a plurality of cams and a shaft to which said cams and dial are rigidly attached, a pinion sleeve a transverse bar fixed to said pinion sleeve; springs carried by said bar having pins that normally rest on the peripheries of said cams, whereby the shaft and dial may move in unison with the pinion sleeve or independently thereof.

3. The combination with a sliding bar, and a rack; of a shaft with cams and a dial rigidly attached thereto; a pinion sleeve with springs mounted thereon, said springs provided with pins that normally press against the peripheries of said cams, whereby said shaft and pinion sleeve may be moved in unison, or independently of each other, substantially as described.

4. In a computing scale, the combination with a value and weight indicating dial, and a price per pound scale adjacent thereto, of a plurality of cams, a shaft upon which cams and the dial are rigidly mounted, a pinion sleeve inclosing said shaft, to which a spring-supporting bar is rigidly attached, springs mounted on said bar carrying pins adapted to normally press against the peripheries of the cams, and means for actuating said pinion sleeve whereby the shaft and dial, and the pinion sleeve may move simultaneously or independently, substantially as described.

5. The combination with a revoluble shaft, and a pinion sleeve loosely inclosing said shaft; of an indicating dial, and cams, rigidly mounted on said shaft; springs carried by said pinion sleeve having pins that normally bear against the peripheries of said cams; and means for transmitting motion to said pinion sleeve to rotate the dial, through the medium of said cams and springs which also return said dial to its normal position, substantially as specified.

6. The combination with a sliding bar, a rack, and a revolving dial upon which are indicated in circumferential columns, units and fractions of weight, and in radial spaces graduated numbers indicating the values of said weights, of a shaft to which said dial is fixed, cams ($h$) and ($h'$) also fixed to said shaft, a pinion sleeve ($d$) carrying a bar ($e$), springs ($f$) and ($f'$) mounted on said bar and provided with pins that normally rest on the peripheries of said cams, whereby the dial may be moved simultaneously with the sliding bar, or released from the movement of said sliding bar, substantially as described.

In testimony whereof I have hereunto set my hand this 28th day of May, 1894.

JOHN HENRY SWIHART.

Witnesses:
R. J. McCARTY,
CHAS. A. HOYT.